United States Patent [19]

Endo et al.

[11] Patent Number: 4,612,581
[45] Date of Patent: Sep. 16, 1986

[54] IMAGE SIGNAL REPRODUCTION CIRCUIT FOR SWING IMAGE SENSOR

[75] Inventors: Yukio Endo; Nozomu Harada; Okio Yoshida, all of Yokohama, Japan

[73] Assignee: Kabushiki Kaisha Toshiba, Kawasaki, Japan

[21] Appl. No.: 711,022

[22] Filed: Mar. 12, 1985

[30] Foreign Application Priority Data

Apr. 13, 1984 [JP] Japan ............................ 59-73959

[51] Int. Cl.$^4$ ............................................. H04N 3/14
[52] U.S. Cl. ...................................................... 358/213
[58] Field of Search .................. 358/212, 213, 209; 250/578

[56] References Cited

U.S. PATENT DOCUMENTS

| | | | |
|---|---|---|---|
| 3,944,816 | 3/1976 | Harada | 358/213 |
| 4,013,845 | 3/1977 | Sugimoto et al. | 179/100.41 R |
| 4,057,830 | 11/1977 | Adcock | 358/127 |
| 4,131,919 | 12/1978 | Lloyd et al. | 358/213 |
| 4,145,721 | 3/1979 | Beaudouin et al. | 358/213 |
| 4,167,754 | 9/1979 | Naguma et al. | 358/167 |
| 4,320,413 | 6/1982 | Takemura | 358/213 |
| 4,335,406 | 6/1982 | Ohba et al. | 358/213 |
| 4,413,284 | 11/1983 | Izumita et al. | 358/213 |
| 4,435,730 | 3/1984 | Bendell et al. | 358/213 |
| 4,479,143 | 10/1984 | Watanabe et al. | 358/44 |
| 4,499,497 | 2/1985 | Levine | 358/213 |
| 4,535,363 | 8/1985 | Harada et al. | 358/213 |
| 4,543,601 | 9/1985 | Harada et al. | 358/212 |

FOREIGN PATENT DOCUMENTS

| | | |
|---|---|---|
| 0067043 | 12/1982 | European Pat. Off. |
| 2394203 | 1/1979 | France |
| 2486387 | 1/1982 | France |
| 57-208418 | 6/1981 | Japan |

OTHER PUBLICATIONS

K. A. Hoagland: "Television Applications of Interline–Transfer CCD Arrays" NASA/JPL Conference on Charge Coupled Device Tech. & Applications, Wash. D.C., Dec. 1976, pp. 152–156.

IEEE Transactions of Electron Devices, vol. ED-20, No. 6, Jun. 1973, "Interlacing in Charge-Coupled Imaging Devices", pp. 539–554 Carlo H. Sequin.

K. A. Hoagland: "Image-Shift Resolution Enhancement Techniques for CCD Imagers", SID 82 Digest, pp. 288–289, 1982.

SID '82 Digest (23.1) 288–289, Image-Shift Resolution Enhancement Techniques for CCD Imagers; K. A. Hoagland.

*Primary Examiner*—Gene Z. Rubinson
*Assistant Examiner*—Stephen Brinich
*Attorney, Agent, or Firm*—Oblon, Fisher, Spivak, McClelland & Maier

[57] ABSTRACT

A CCD output signal reproduction apparatus is applied to a solid state image sensor that performs a swing-driven image pickup operation. This image sensor is synchronized with one frame period and swings periodically and relatively in relation to incident light to pickup the image while changing the sampling positions in the A and B field periods. The carrier generator produces first and second sinusoidal carrier signals which have the same frequency as that of the read out frequency of the image sensor. An amplitude modulator modulates the carrier signals in response to the waveforms of the image signals supplied from the image sensor. Accordingly, amplitude-modulated A, B field image signals, which are phase-shifted by half the pixel pitch of the pixel arrangement of the image sensor. A carrier clamp circuit forcibly clamps the different peak potentials of the carrier waveforms of the amplitude-modulated field image signals to the reference potential level. In this way, when the field image signal whose waveform has been shaped is synthesized on the reproduction screen, it is possible to obtain a one frame image which has a resolution twice that determined by the actual number of pixels.

6 Claims, 63 Drawing Figures

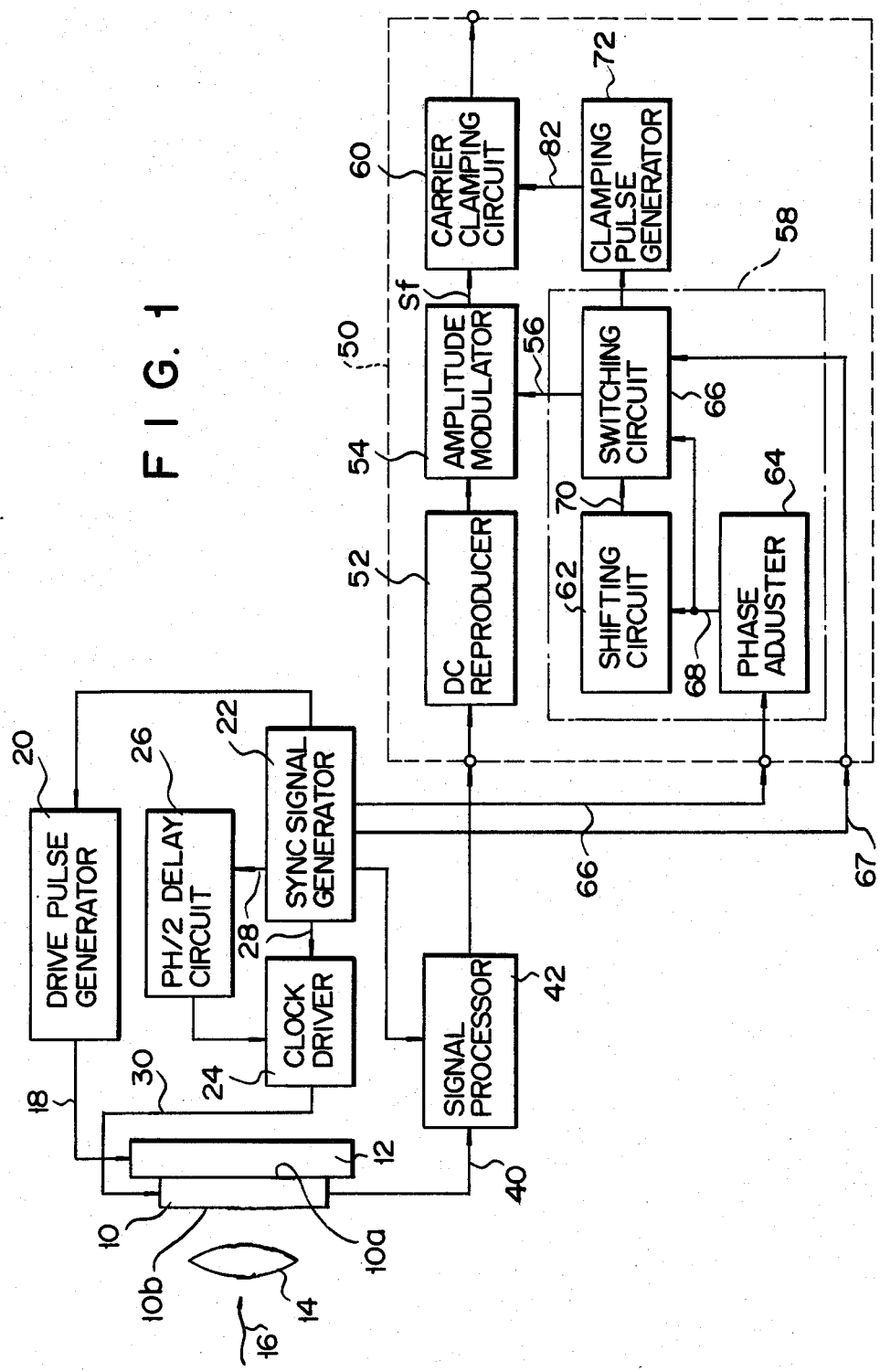
F I G. 1

F I G. 6A
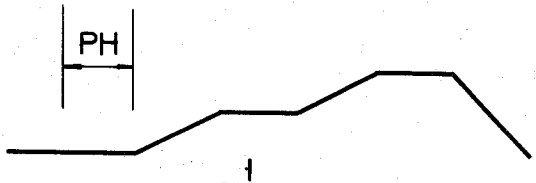
F I G. 6B
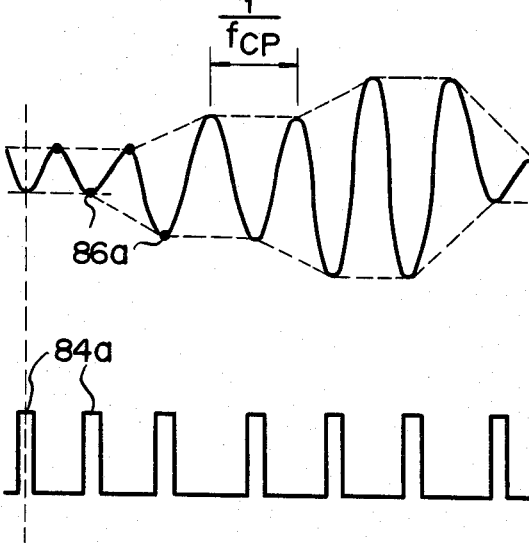
F I G. 6C
F I G. 6D
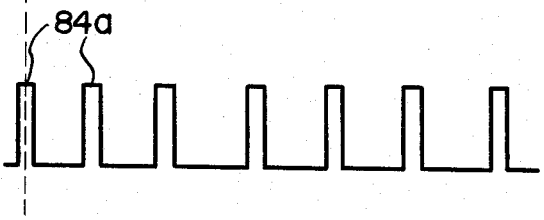
F I G. 6E
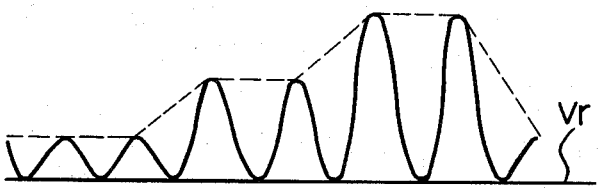
F I G. 6F

F I G. 10A 
F I G. 10B 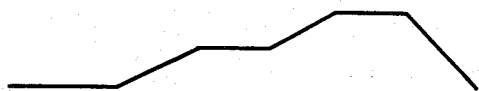
F I G. 10C 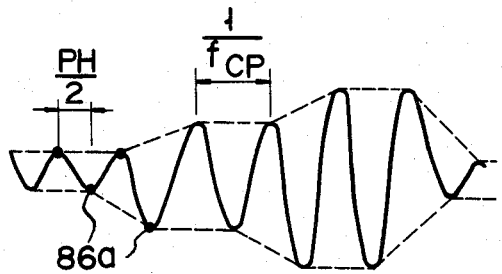
F I G. 10D 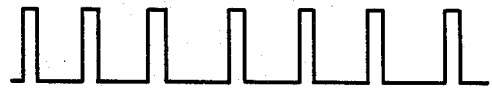
F I G. 10E 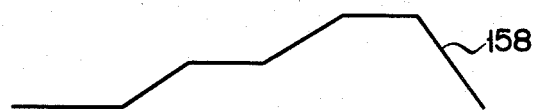
F I G. 10F 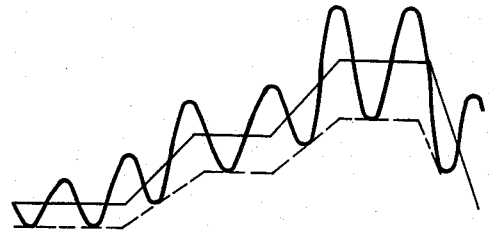

IMAGE SIGNAL REPRODUCTION CIRCUIT FOR SWING IMAGE SENSOR

BACKGROUND OF THE INVENTION

The present invention relates generally to an image signal reproduction device for a solid-state image sensor and, more particularly, to a reproduction circuit device for reproducing an output image signal picked up by a solid-state image sensor, which image sensor is swing-driven to periodically shift in position relative to the incident image light.

A swing-driven imaging technique for producing an image of high resolution, the degree exceeding the actual number of picture elements or pixels, by employing a solid-state image sensor having a limited number of pixels is known among persons skilled in the art. According to this specific imaging technique, a solid-state image sensor is typically arranged so as to vibrate or swing in a plane orthogonal to the incident image light, horizontally, perpendicularly, and relative to the image light in a given vibration mode. When the sensor is applied to an NTSC television system in which one frame consists of two fields, the image sensor swings so that it senses the incident image light at different sampling positions during the different field periods. As a result, the reproduced image picture has doubled resolution, which corresponds to the resolution obtained by a fixed image sensor having twice the number of pixels.

The image signal obtained by such a swing-driven image sensor includes a reset noise component (e.g., approx. 500 mV) and a DC offset component (e.g., approx. 5 to 10 V). Therefore, it is necessary to reproduce an image of high enough quality that the noise components can be removed from the CCD output signal without causing waveform deterioration of the rectangular image signal components. It is desirable that a linear detection circuit be used for removing the noise components.

The commercial production of the linear detection circuit arrangement, however, is difficult since the cicuit is required to have very high frequency characteristics. In order to carry out the image signal processing without deteriorating the image signal component in a case where the frequency fcp of a clock pulse of the image sensor is 7.16 MHz, it is necessary for the linear circuit to pass tertiary high frequency components contained in the image signal and, consequently, the frequency band of the linear detection circuit must be at least 20 MHz or more. In a detection circuit having a wide frequency band, deterioration of the signal phase characteristic cannot be avoided. As a result, a problem arises in that amplitude distortion is generated between the image signals occurring in both fields and this causes flicker noise.

SUMMARY OF THE INVENTION

It is, therefore, an object of the invention to provide a new and improved image signal reproduction circuit, which is adapted for use in a solid-state swing-driven imaging device, and which can reproduce an output image picture picked up by the imaging device while maintaining high resolution and high image quality.

According to the present invention, a CCD output signal reproduction device is adapted for use in a solid-state imaging device that performs a swing image pick-up operation. This swing imaging device periodically and symmetrically swings in relation to incident light and in synchronism with each frame. Image pick up is carried out while changing sampling positions within a plurality of different field periods included in one frame period. A carrier generator generates first and second sinusoidal carrier signals having a substantially identical frequency to the signal charge read-out frequency of the imaging device, and having a peak point corresponding to the first and second sampling positions of the imaging device, which occur in the respective first and second field periods of a frame. An amplitude modulator receives these carrier signals and amplitude-modulates them in response to the waveform of the first and second field image signals supplied from the imaging device. The result of this is that first and second amplitude-modulated image signals that are phase-shifted by a half pitch of the pixel arrangement of the imaging device. A signal processing circuit is connected to the amplitude modulator for shaping the first and second amplitude-modulated field image signals such that the different peak potentials of the waveform of the first and second amplitude-modulated field image signals match, or clamp, the reference potential level. Accordingly, if this re-formed field image signal is synthesized on the reproduced image, the resolution of a frame image, which is determined by the original number of pixels in the imaging device, can be increased.

BRIEF DESCRIPTION OF THE DRAWINGS

The present invention can be best understood by reference to the accompanying drawings, in which:

FIG. 1 is a schematic of the entire configuration of an imaging system to which an embodiment of the image signal reproduction device of the present invention is applied;

FIGS. 5A to 5E show the waveforms of signals generated from the essential sections of the imaging system shown in FIG. 1;

FIGS. 6A to 6K show the waveforms of signals generated from the essential circuit sections of the image signal reproduction device provided in the imaging system of FIG. 1;

FIGS. 10A to 10M show waveforms of signals generated from the essential circuit sections of the image signal reproduction device provided in the imaging system of FIG. 9;

DETAILED DESCRIPTION OF THE PREFERRED EMBODIMENTS

Figure 2:
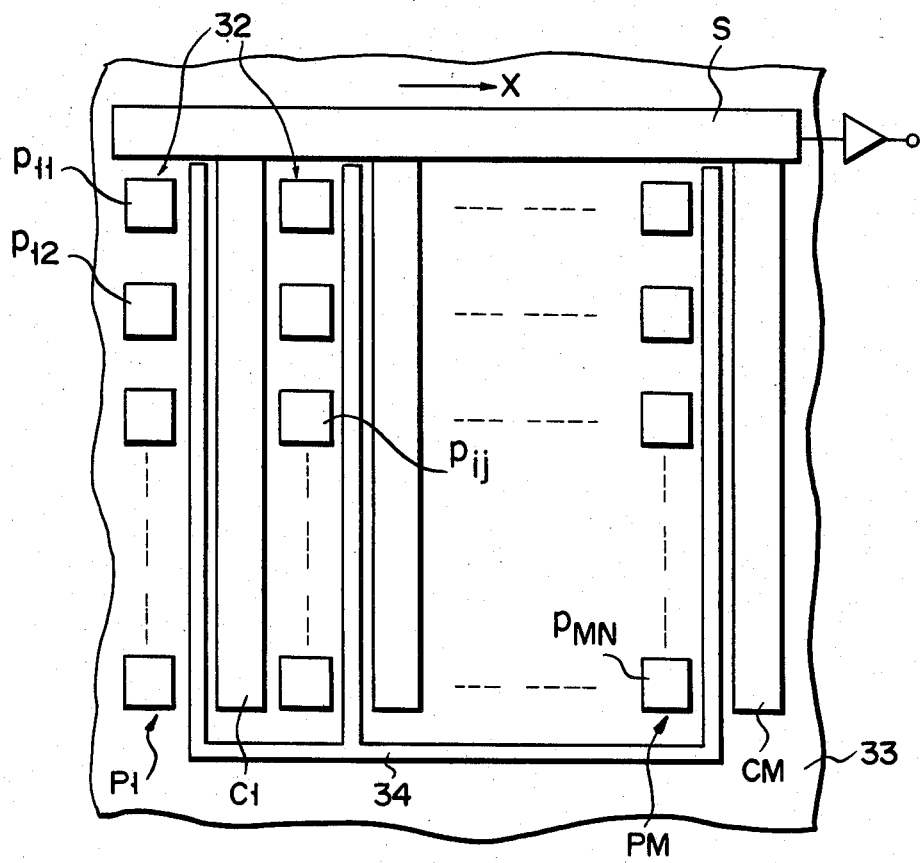
FIG. 2 shows a plan configuration of an image sensing region of a swing-driven solid-state image sensor contained in the imaging system shown in FIG. 1.

FIG. 1 shows an embodiment of this invention in which the entire configuration of an image sensing system is constructed in such a manner that a solid-state image sensor swings to different sampling positions during different field periods included in one frame period.

An interline-transfer type charge-coupled device (IT-CCD) 10 is employed as an area imaging device. The IT-CCD 10 is secured or fixed to a vibration stand plate 12 on the back surface 10a thereof opposite to an image sensing region 10b, which faces a lens 14 to which an optical image 16 is introduced. This stand 12 periodically vibrates relative to an incoming light radiation 16 in response to a swing drive signal 18 from a drive pulse generating circuit 20. Thus, the IT-CCD 10 secured to the vibration stand 12 vibrates or swings in a similar vibration mode.

In this embodiment, the CCD 10 is driven, for example, to horizontally vibrate during one frame period of an image sensing operation: a period in accordance with an NTSC standard television system in which one frame consists of two fields. Therefore, the swing CCD 10 is disposed at different sampling positions in the A and B fields periods of one frame. The vibrating amplitude of the CCD 10 at this time is set to one half of the pitch PH of a picture element. In other words, the spatial sampling region in the horizontal direction of the IT-CCD 10 in one frame effectively becomes two positions.

In order to swing-drive the CCD 10, a sync signal generator 22, a clock driver 24 and a PH/2 delay circuit 26 are provided. The sync signal generator 22 is connected to the clock driver 24 and the PH/2 delay circuit 26. The sync signal generator 22 generates a sync pulse signal (or timing signal) 28, which contains pulses necessary to drive the CCD 10 and pulses necessary for image signal processing, in accordance with the NTSC system. The delay circuit 26 serves to delay the clock pulses of a horizontal readout register (not shown) of the CCD 10, corresponding to one half of the horizontal pixel pitch PH of the CCD 10. In other words, the PH/2 delay circuit 26 serves to delay by PH/2 the horizontal readout timing of the CCD 10 in the one field B, of the two fields contained in one frame. The clock driver 24 produces a clock signal 30 suitable for the IT-CCD 10.

As shown in FIG. 2, the CCD 10 has a photosensitive section 32 consisting of photosensitive elements or photodiodes $p_{11}, p_{12}, \ldots, p_{ij}, \ldots, p_{MN}$ of N by M (where N=500 and M=400, for example). The photodiodes p are arranged in a matrix form on a CCD substrate 33. M units of vertical CCD transfer sections $C_1, \ldots, C_M$ are arranged adjacent and opposite to M lines of photodiode arrays $P_1, \ldots, P_M$. The vertical CCD transfer sections $C_1, \ldots, C_M$ are parallel with the photodiode arrays $P_1, \ldots, P_M$. The vertical CCD transfer sections $C_1, \ldots, C_M$ are connected to a horizontal CCD shift register S at their final stages. A field shift gate or FSG 34 is formed to have gate portions each extending between the vertical photodiode arrays $P_1, \ldots, P_M$ and the vertical CCD transfer sections $C_1, \ldots, C_M$. When pulse voltage signal (or gate control signal) is supplied to the FSG 34, signal charges stored in the photodiodes $p_{11}, p_{12}, \ldots, p_{ij}, \ldots, p_{MN}$ because the incident light radiation is transferred to the vertical CCD transfer sections C. The charges or signal carriers transferred to the transfer sections C are further transferred successively to the horizontal CCD shift register S.

Figure 3:
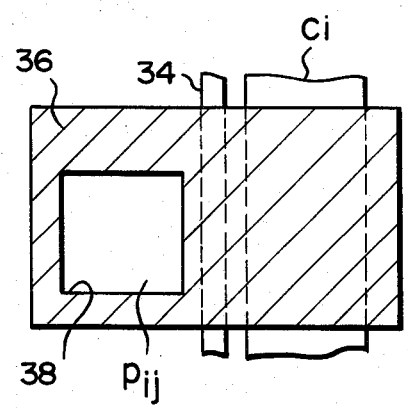
FIG. 3 is a detailed plan view of part of a region of a swing-driven solid-state image sensor contained in the imaging system shown in FIG. 1.

FIG. 3 is a partial plan view of an enlarged image sensing region corresponding to a pixel or one cell of the photosensitive sections 32 of the IT-CCD 10 shown in FIG. 2. A portion 36, which is illustrated by a shaded part, is an aluminum electrode for shielding incoming light radiation. The electrode 36 has an opening 38 under which a photodiode $p_{ij}$ corresponding to a signal image sensing cell is disposed. A vertical CCD Ci and the FSG 34 extend under the aluminum electrode 36 which serves as a nonsensitive region. The aluminum electrode 36 carries out optical separation between the adjacent or neighbouring photodiodes.

Figure 4A:
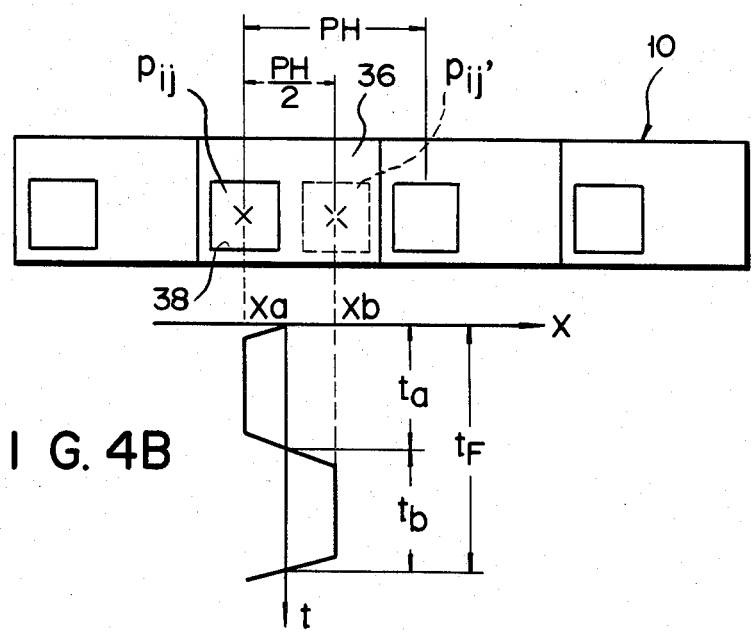
FIG. 4A is a plan view of picture element regions and shows the swing-driven image pick-up mode of the solid-state image sensor of FIG. 2.
Figure 4B:
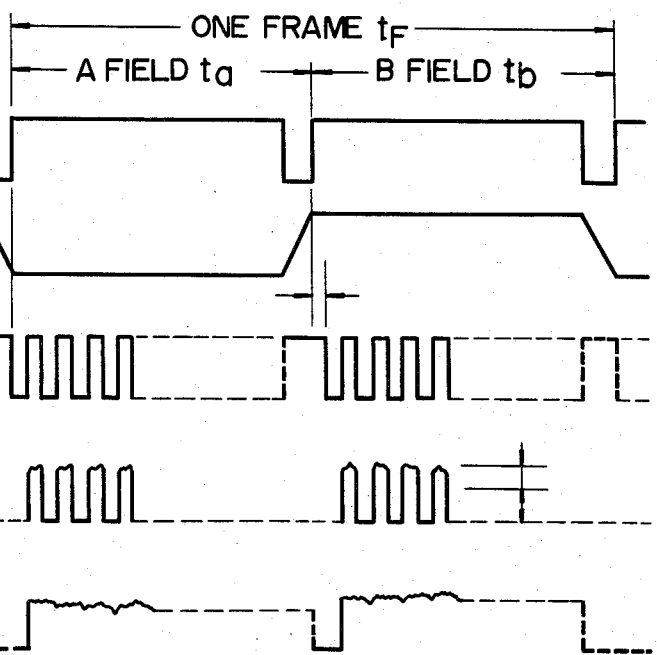
FIG. 4B is a graph showing a vibration waveform of the CCD image sensor caused corresponding to the picture element region of FIG. 4A.

FIG. 4A illustrates the swing-driven image sensing mode of an IT-CCD 10, which has the same configuration as that shown in FIG. 3. The CCD 10 is driven to swing relative to the incoming image light 16 such that the opening 38 of each cell of the CCD is alternatively disposed at two different sampling positions of the horizontal direction (X-axis) in one frame period tF consisting of two field periods (a and B) ta and tb. FIG. 4B shows the vibration waveform of how the position of one cell $p_{ij}$ of the CCD 10 varies as plotted on a time lapse in one frame period tF. As is apparent from FIG. 4B, the cell $p_{ij}$ is respectively diplaced to different positions Xa, Xb of the X axis (the distance is equal to half the pixel pitch PH, i.e. PH/2) in the field periods ta and tb. Thus, the spatial sampling region in the horizontal direction of one frame period tF of the IT-CCD 10 becomes two positions, so that the IT-CCD 10 can generate an image pickup signal 40 with doubled image resolution in the horizontal direction of the CCD.

Returning again to FIG. 1, the image pickup signal 40 is supplied to an image signal processing circuit 42, which has an ordinary construction, and in which a reset noise contained in the CCD output image signal 40 is then processed for blanking, white clipping, gamma-correcting, and the like. After completion of the signal processing, the image signal 40 has a waveform that horizontally averages the CCD output level. The image signal output from the signal processor 42 is an image signal whose waveform is averaged with respect to the CCD horizontal direction, and is then supplied to an image signal reproduction device 50 according to the present invention.

Image signal reproduction device 50 contains a clamp circuit or DC reproducer 52, which converts the input image signal to a signal having DC components, a AM circuit (amplitude modulator) 54, using the output signal from DC reproducer 52, amplitude-modulates carrier signal 56 supplied from carrier generator 58, and a carrier clamp circuit 60, which clamps the peak portion (normally having different voltage levels) of the negative side of the output signal, which has been modulated by AM circuit 54 to a prescribed voltage level. Carrier generator 58 includes waveform shift circuit 62, phase matching circuit (phase adjuster) 64 and switch circuit 66. A pulse signal 66 having a frequency equal to, or an integral multiple of, the frequency of the clock pulse signal (e.g., 7.16 MHz) for the horizontal read out register of CCD 10, is supplied from the sync signal generator 22 to the phase matching circuit 64. Waveform shift circuit 62 shifts the waveform of the output signal 68 from the phase matching circuit 64 by 180° to generate signal 70 (i.e., an inverted signal). The field pulse signal 67 from the sync signal generator 22 is supplied to switch circuit 66, which alternately and in synchronism with the A and B fields ta, tb of one frame period tF outputs a signal 68 from phase matching circuit 64 and a signal 70 from and phase-shifted 180° by waveform shift circuit 62. These alternately output signals are supplied to the AM circuit 54. Clamping pulse signal generating circuit 72 is connected to carrier clamping circuit 60 and switch circuit 66 for generating a rectangular pulse signal required by the carrier clamping circuit 60.

Figure 6G:
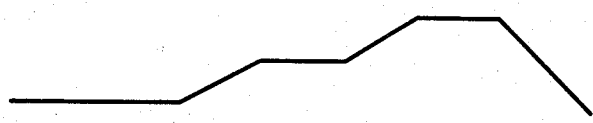

The following is a description, in conjunction with FIGS. 6A to 6K, of the operation mode of the image signal reproduction device. The spatial sampling points of the A and B fields are shown by references numerals 80a and 80b at the stepped image signal levels shown in FIGS. 6A and 6F, when image pickup is performed by a swing IT-CCD 10, as shown in FIG. 6A, of an object whose luminance (brightness) varies in steps from the left to the right on an image screen. The A field sampling point 80a and B field sampling point 80b are shifted by the horizontal image pixel (image) pitch PH/2 of the CCD 10 using the starting point of the horizontal image signal as the reference. By synthesizing each field output signal, which has a rectangular waveform corresponding to the sampling points 80 (which means displaying the image substantially simultaneously on the screen), the horizontal resolution of the reproduced image can be doubled compared to that obtainable by the actual number of pixels of the CCD 10.

With a conventional signal processor 42, the pulse waveform of the CCD image signal becomes an averaged continuous waveform so, if left unchanged, a high resolution could not be obtained even if the A and B field image signals are synthesized. This is the problem that is fully solved by the novel reproducing device 50 of this invention.

The A, B field image signals with averaged waveforms are turned into image signals that include DC components by the DC reproducing circuit 52 of the signal reproducing device 50, and are supplied to the AM circuit. The waveforms of the image signals of the A and B fields are illustrated in FIGS. 6B and 6G. Using these signals the AM circuit 54 modulates sinusoidal carrier signal 56, which has the same frequency as the CCD horizontal read out frequency fCP. This signal is supplied from carrier generator 58 and, it should be noted that the phase is set such that the peak in one cycle of the signal matches the spatial sampling point shown by black dots in FIGS. 6A, 6C, 6F and 6H.

A sinusoidal carrier signal that satisfies the above conditions is produced by circuit 58. The signal phase of the horizontal read out clock signal 66 (frequency=fCP) supplied from sync signal generator 22 is adjusted to accurately match the spatial sampling point by the phase matching circuit 64. The signal output by circuit 64 is phase-shifted 180° by the phase shift circuit 62 to produce a phase-inverted clock signal 70. The clock signals 68 and 70, whose signal peak points accurately match the spatial sampling points and are phase-inverted from each other, are alternately supplied to the AM circuit 54 such that they are synchronized with changes in the field periods by the action of the switching circuit 66. In other words, switching circuit 66, in response to field pulse signal 67, matches the phase-inverted clock signals 68 and 70 with the switches in the A and B field periods and alternately supplies them to the AM circuit 54.

Figure 6H:
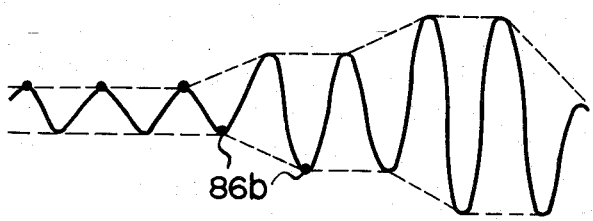
Figure 6I:

The amplitude-modulated A, B field image signals Sf output by the AM circuit 54 have the waveforms shown in FIGS. 6C and 6H. The sinusoidal phase of these signals are shifted by half a pixel pitch PH. (Accordingly, the distance between the peak of the A field signal shown in FIG. 6C and the corresponding peak of the B field signal shown in FIG. 6H is shifted by PH/2.) These signals Sf are next supplied to carrier clamping circuit 60, which simultaneously receives clamping pulse signal 82, whose waveform varies in response to switches in the A, B fields, from circuit 72. Clamping pulse signal 82 has a pulse component 84a or 84b. As shown in FIGS. 6D and 6I, these pulse components are accurately synchronous with the negative portion of the waveform peak of each field image signal shown in FIGS. 6C and 6H.

Figure 6J:
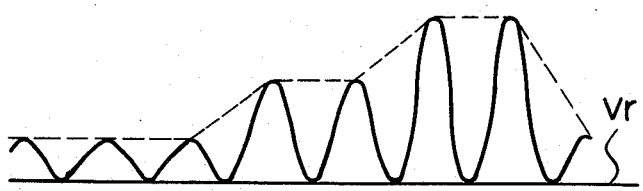
Figure 6K:
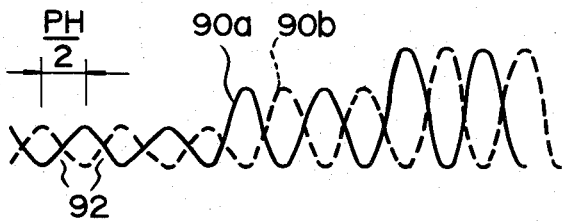

The clamping circuit 60 performs a carrier clamping operation on clamping pulse signal 82 and, as a result, the negative peaks 86a, 86b of the A, B field image signals Sf output by the AM circuit 54 are forced (clamped) to a constant voltage level Vr, as shown in FIGS. 6E and 6J. Therefore the voltage level of the respective signal peak 86 is aligned with the voltage level Vr. Even after this clamping operation, the signal phases are still PH/2 shifted as before and, accordingly, the negative peak 86a of the clamped A field signal and the negative peak 86b of the clamped B field signal are, of course, shifted by PH/2 as is shown in FIG. 6K. These A, B field image signals are synthesized for the reproduction image, (Note: This is not an electrical adding operation, but rather a substantially simultaneous display on the screen to form one frame image.) and a monitor signal of one frame image is obtained. The horizontal resolution of an image reproduced in this way is twice the resolution that is determined simply by the actual number pixels of the CCD 10.

Furthermore, according to this embodiment, in the monitor signal of one frame image shown in FIG. 6K overlapping portions are inevitably formed between adjacent pixel signals (pixels of the A, B field image signals) as shown by "92" in the same Figure. Consequently, the reproduced frame picture image has a denser picture quality in the horizontal direction. This makes it possible to reproduce a high quality image that continuous smoothly in the horizontal direction (the boundaries of the pixels are not noticeable in the horizontal direction).

Figure 7:
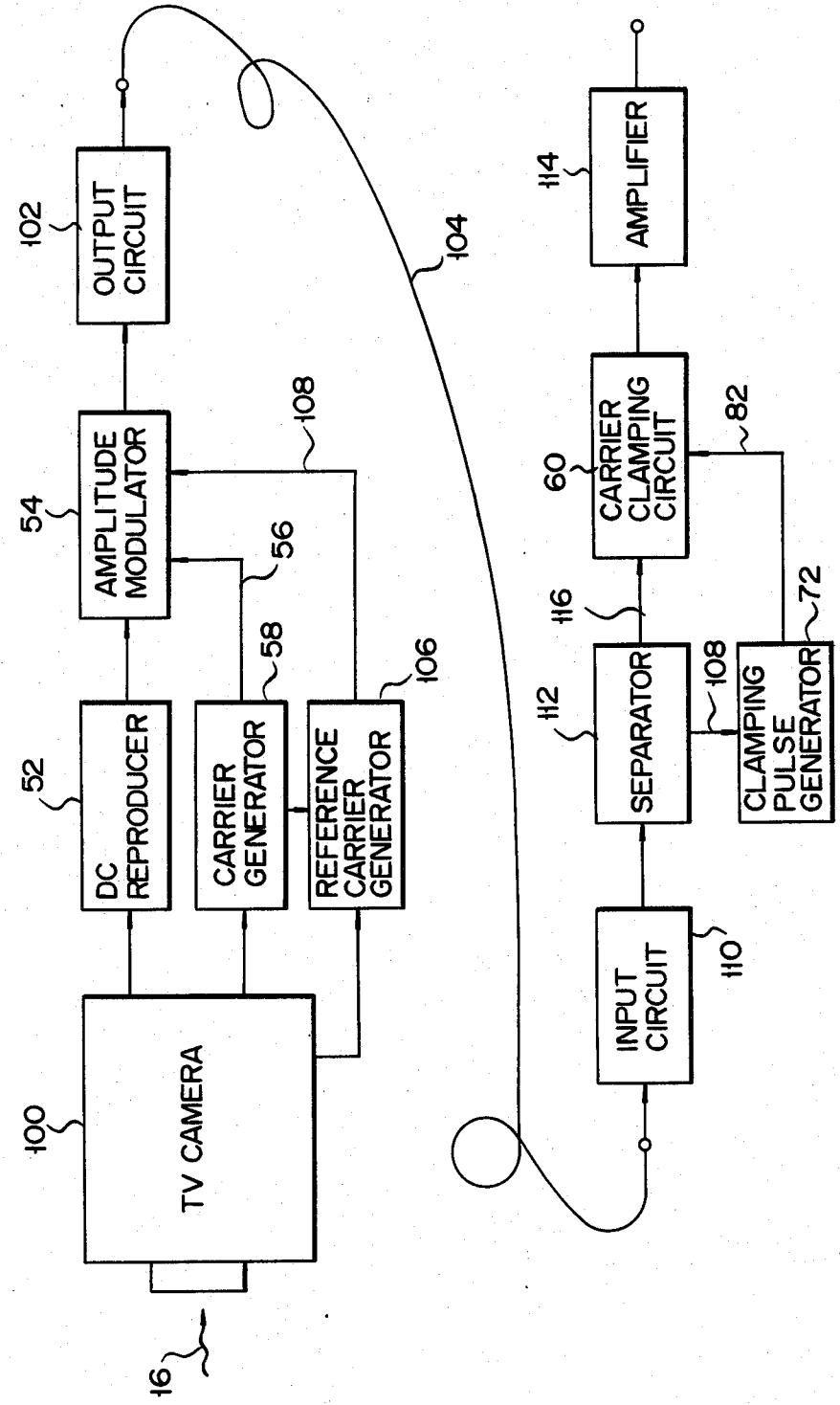
FIG. 7 is a schematic of the entire configuration of an imaging system according to a second embodiment of the present invention, wherein a signal transmission cable is provided to communicate between an imaging unit and a signal reproduction unit.

The second embodiment shows that the concept relating to the image output signal of the reproduction circuit of this invention can be applied even to an image reproduction system in which the image pickup section and the reproduction section are separated and a relatively long signal transmission cable, such as an optic fiber cable, is provided. FIG. 7 shows an example of such a system. The same reference numerals have been used in this second embodiment to describe parts similar to those of the first embodiment, and a description has been omitted.

TV camera unit 100 contains a CCD device (such as 10) for performing the swing image pickup operation shown in FIG. 1. The camera is connected to a signal transmission circuit 102 via DC reproducer 52 and AM circuit 54. The output image signal from the camera unit 100 is converted to a signal that includes DC components by DC reproducer 52. Using the DC reproducer 52, AM circuit 54 modulates carrier signal 56 supplied from carrier signal generator 58 in accordance with the amplitude modulation technique. These amplitude-modulated field image signals are amplified by the output circuit 102 and transmitted to one terminal of a signal transmission line 104. At this time, the output circuit 102 simultaneously performs a known impedance changing operation whereby the impedance of the field image signals is decreased. It should be noted that a reference carrier generator 106 is connected to camera unit 100 and carrier generator 58, for generating a reference carrier signal 108, which has a phase uniform with carrier signal 56, in the horizontal (or vertical) blanking period. This reference carrier signal 108 is necessary for later producing a clamping pulse signal (in the separate reproduction section). This reference carrier signal 108 is added with the amplitude-modulated image signal and output from the output circuit 102.

The other terminal of the signal transmission line 104 is connected to the input circuit 110 of the image signal reproduction section. Separator 112 separates the image signal into an effective image signal component included in the effective period TE and into the reference carrier signal component included in the horizontal blanking period TB corresponding to a noneffective period. This separator 112 is connected to the carrier clamping circuit 60, and clamping pulse generator 72 is connected to the separator 112 and the carrier clamping circuit 60. The clamping pulse generator 72 supplies continuous clamping pulse signal 82 in phase with the reference carrier signal to the carrier clamping circuit 60.

Using the clamping pulse signal, the carrier clamping circuit clamps the effective image signal separated and extracted by the signal separator 112 in the manner described earlier. The signal output by carrier clamping circuit 60 is supplied to signal amplifier 114 and is amplified to the signal level required for reproduction on a known display unit (not shown).

The operation of the above image signal transmission system will be described with reference to FIGS. 8A to 8E. These Figures show the waveforms of the image signals obtained from the main circuit components when TV camera 100 picks up incoming image light 16 whose luminance (brightness) varies in steps the same as in the first embodiment. The hatched portions are the same as the sinusoidal waveforms shown in FIGS. 6A to 6K. (This waveform matches the peak at the actual spatial sampling peak.)

Figure 8A:
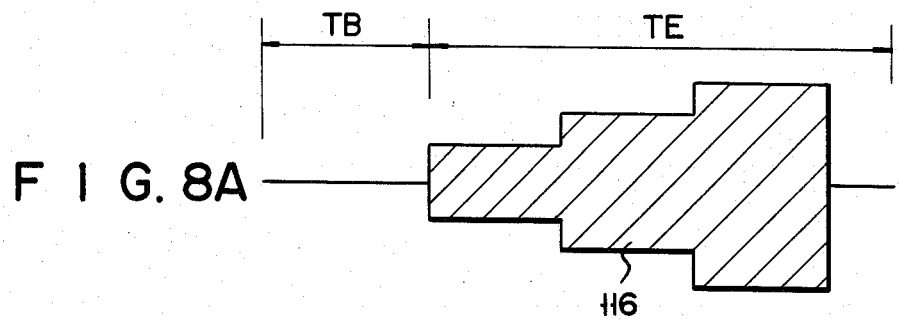
FIGS. 8A to 8E show waveforms of the essential signals generated by the main circuit components included in the signal reproduction device provided in the imaging system of FIG. 7.
Figure 8B:
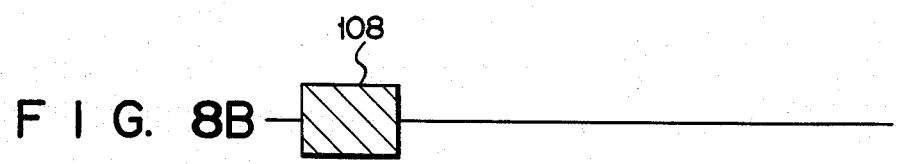
Figure 8C:
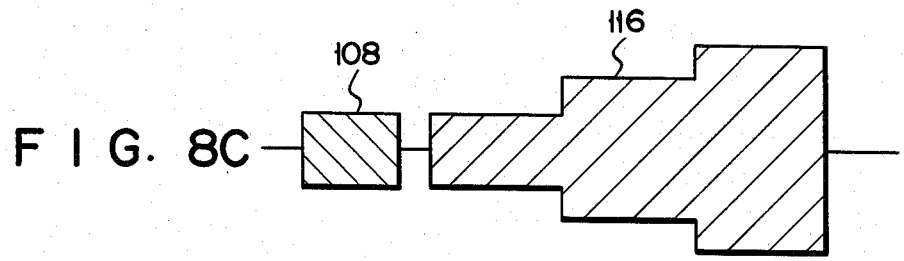
Figure 8D:
Figure 8E:
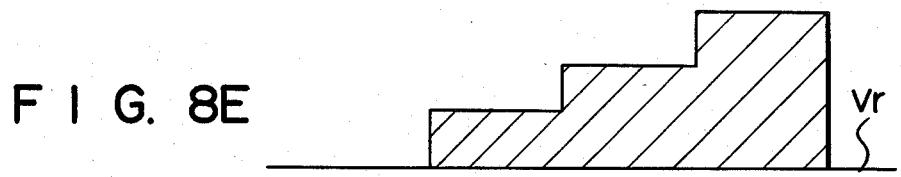

The amplitude modulated effective field image signal 116 is included in the effective period TE of one horizontal scanning period, as shown in FIG. 8A. With this structure, reference carrier signal 108 (see FIG. 8B), whose phase is combined with that of the effective field image signal 116, is added such that it is within the horizontal blanking period TB. The adding of the effective image signal 116 and the reference carrier signal 108 is performed by the AM circuit 54 after which the waveform output from the output circuit 102 and transmitted to line 104 is as shown in FIG. 8C. Accordingly, the transmission band, which must be set for transmitting the image signals output from the image pickup unit via transmission line 104, may be as low as 7.16 MHz±3.6 MHz. (In the prior art structure, a minimum band width of 20 MHz was required to accomplish the same function.) The reason this is possible is that there are absolutely no DC signal components included in the signal transmitted along cable 104. Accordingly, with this kind of structure, the performance requirements of signal transmission cable 104 are reduced improving the practicality of the device.

After being received by input circuit 110, the reference carrier signal component 108 included in the blanking period TB of the transmitted image signal is separated from the effective image signal 116 by separator 112. The separated reference carrier signal component 108' is supplied to clamping pulse generator 72 where, based on this signal, generator 72 produces a clamp pulse signal 82, which has the regular waveform shown in FIG. 8D. Also, the separated effective field image signal 116 is sent from separator 112 to clamping circuit 60 and is clamped such that the signal waveform thereof is reformed as described earlier. Consequently, the waveform of the effective field image signal 116 is shaped such that its negatively stepped signal level is forced to match a constant voltage level. The result of this is that it is possible to obtain a frame reproduction image of high resolution.

According to this embodiment, when noise of a low frequency wave is mixed with signal in the transmission path, this noise varies in substantially the same amplification direction in the carrier period so it can be eliminated by clamping in the carrier period after reception. Therefore, it is possible to construct a transmission system having a high S/N ratio. Also, it is possible to easily obtain the kind of signal required for reliable, high resolution reproduction of an image because it is possible to insert the reference carrier signal into the blanking period.

Figure 9:
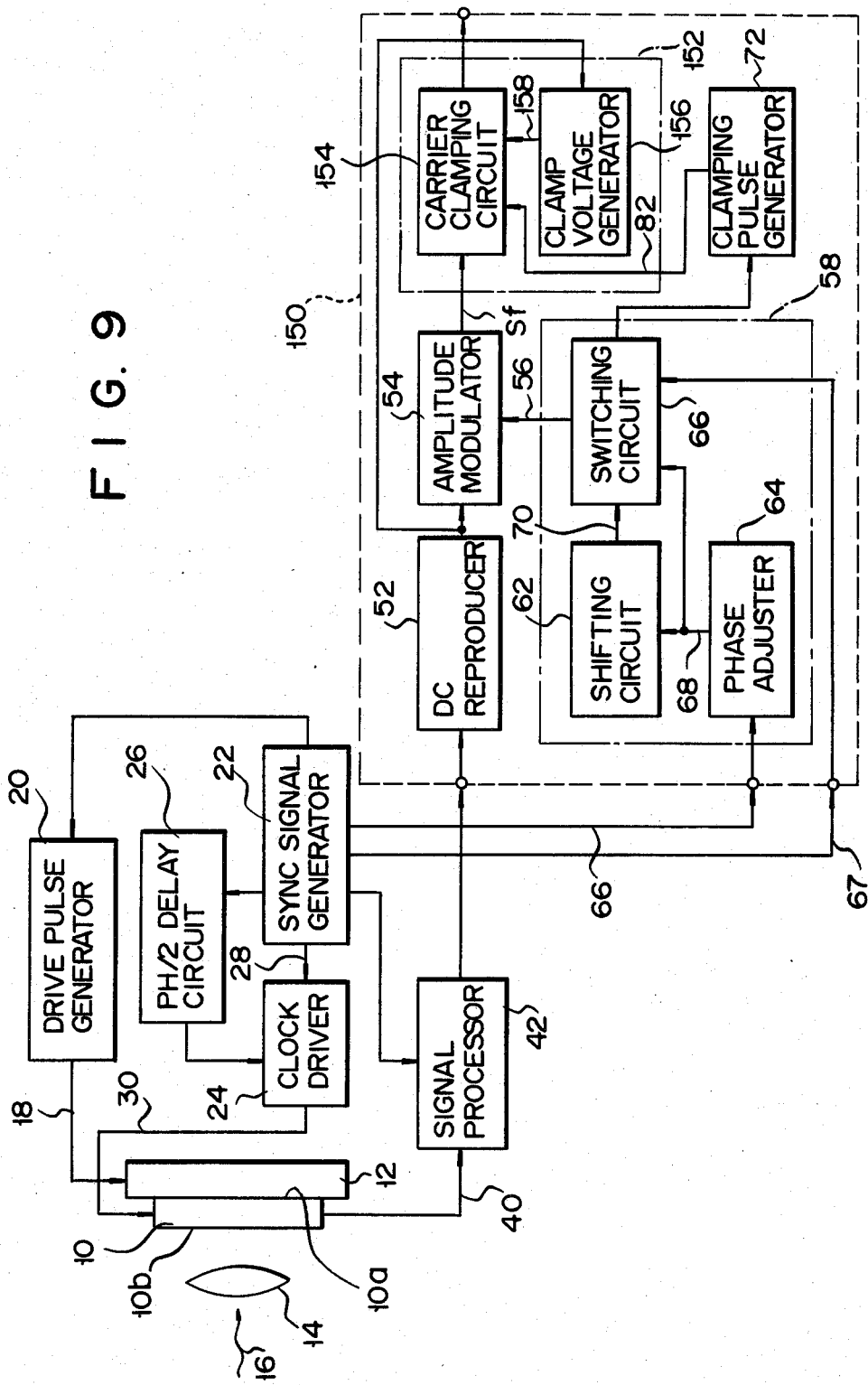
FIG. 9 is a schematic of the entire configuration of an imaging system to which an image signal reproduction device of a third embodiment of the present invention is applied.

FIG. 9 shows a signal reproduction device for a CCD which performs the swing pickup operation, according to a third embodiment of this invention. The same reference numerals have been used for the same parts as in the first embodiment, and a description has been omitted.

Output signal reproduction circuit 150 includes clamp circuit 152, which is connected to AM circuit 54 and clamping pulse generator 72, and which includes clamp voltage generator 154 and carrier clamping circuit 156. Clamp voltage generator 154 receives an averaged image signal from DC reproducer 52 and uses its waveform in supplying the reference clamp voltage signal 158 to carrier clamping circuit 156. The voltage level of the reference clamp voltage signal 158 is not fixed at a constant level, but rather varies in response to the waveform of the averaged image sigal.

The carrier clamping circuit 156 is connected to the AM circuit 54, clamping pulse generator 72 and the clamp voltage generator 156, and clamps the amplitude-modulated A, B field image signals Sf output by AM circuit 54 based on the clamping pulse signal from circuit 72. In other words, carrier clamping circuit 156 shapes the potential of the negative peak of the A, B field image signals, which are amplitude-modulated using the sinusoidal wave carrier, such that they match the variable reference clamp voltage level from the clamp voltage generator 156.

The following is a description of the operation of the image signal reproduction device above with reference to FIGS. 10A to 10M. FIGS. 10A to 10D and FIGS. 10G to 10J correspond respectively FIGS. 6A to 6D and FIGS. 6F to 6I, which were used in describing the operation of the first embodiment.

Figure 10G:
Figure 10H:
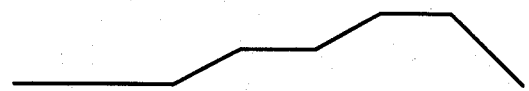
Figure 10I:
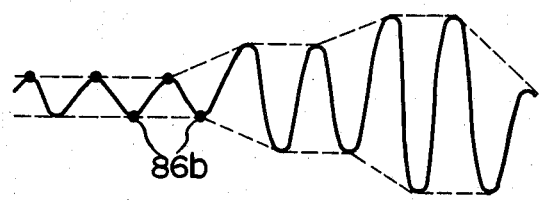
Figure 10J:

A, B field image signals, such as those shown in FIGS. 10B and 10H, are output from reproducer 42, when an object having a luminance (brightness) that varies in steps (FIG. 10A or 10G) is picked up by swing IT-CCD 10. The waveforms of these signals are shifted by half of the horizontal pixel pitch PH using the starting of the horizontal image signal as the reference. These signals are supplied to the AM circuit 54 via DC reproducer 52 of the output reproduction circuit 150, and are converted to the amplitude-modulated image signals shown in FIGS. 10C and 10I, respectively.

Figure 10K:
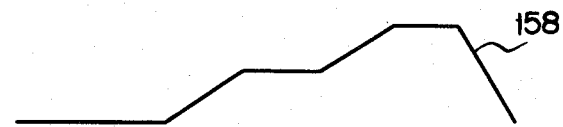
Figure 10L:
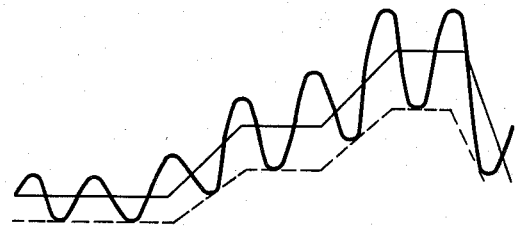

The amplitude-modulated A, B field image signals obtained in this way are supplied to the clamping circuit 154 to which reference clamp signals 158 having waveforms such as those shown in FIGS. 10E and 10K are simultaneously supplied. Accordingly, clamping circuit 154 forces (clamps) the negative waveform peaks (86a, 86b) of the sinusoidal A, B field image signals to match the variable reference clamp voltage levels (shown in FIGS. 10E and 10K), which are formed by DC-reproducing of the averaged CCD output signals in the DC reproducer 52, as shown in FIGS. 10F and 10L.

Figure 10M:
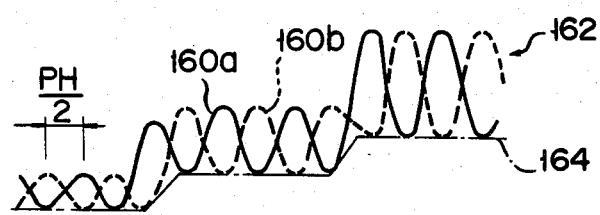

Even after the clamping operation, the waveform phase of the A, B field image signals is shifted only by PH/2 as before and, accordingly, negative peak 86a of the clamped A field image signal and the corresponding peak 86b of the clamped B field image signal are, of ocurse, shifted by PH/2, as is shown in FIG. 10M. These images are synthesized on the display screen for the reproduced image, (Note: This is not an electrical adding operation, but rather a substantially simultaneous display on the screen to form one frame image.) and the monitor signal of a one frame image is obtained. In FIG. 10M, the A field image signal is "160a" and the B field image signal is "160b".

The horizontal resolution of a picture image obtained in this way is twice that what would be obtained simply from the actual number of CCD pixels. Furthermore, the high resolution image signal obtained in this embodiment has sinusoidal signal components (carrier components) so picture distortion can be kept to a minimum. Also, the clamp operation is repeated for every pixel period so it is possible to eliminate noise included in the image signal and to improve the signal-to-noise ratio. As shown in FIG. 10M, the final reproduction image signal obtained by the output reproduction circuit 150 includes not only the high resolution image signal 162 but the averaged image signal 164 corresponding to the output signal from DC reproducer 52 as well. This makes it possible to improve the contrast characteristics of the reproduced image.

Figure 11:
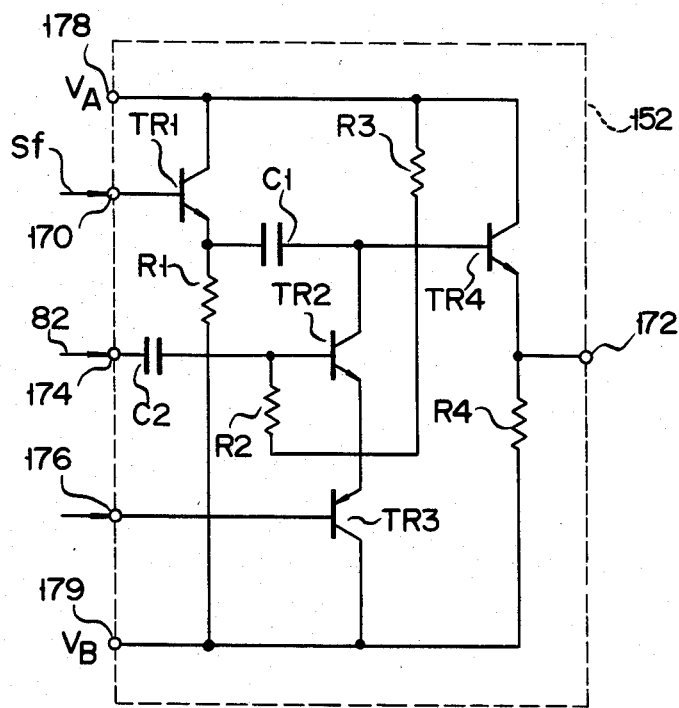
FIG. 11 shows the circuit configuration of a clamping circuit unit provided in the image signal reproduction device shown in FIG. 9.

FIG. 11 shows a detailed example of the internal structure of clamping circuit section 152 which is included in the output reproduction circuit 150. Clamping circuit section 152 basically includes four transistors TR1–TR4. Transistor TR1 has a base that is connected to input terminal 170, which supplies the amplitude-modulated A, B field image signals Sf. Transistor TR1, together with the resistor R1, which is connected to its emitter, forms an emitter follower circuit. This emitter follower circuit serves as an input buffer.

Transistor TR4, on the other hand, has an emitter that is connected to the output terminal for generating a reproduction image signal. Transistor TR4, together with the resistor R4, which is connected to its emitter, forms an emitter follower circuit that serves as an output buffer.

The emitter of transistor TR2 is, by way of capacitor C2, connected to terminal 174 to which the clamping pulse signal 82 is supplied. The collector of transistor TR2 is connected to the emitter of transistor TR1 via capacitor C1 as well as to the base of transistor TR4. With the connection of resistor R2 to its base, transistor TR2 forms the previously described clamping circuit 154 (FIG. 9).

Transistor TR3 has an emitter connected to the emitter of transistor TR2, and a base connected to the terminal 176 which supplies the averaged image sigal output from the DC reproducer 52. Transistor TR3 together with capacitor C2 forms the reference clamp voltage level generator 156. In FIG. 11 VA and VB are the source voltages for operating these circuits and are connected to power source terminals 178, 179, respectively.

With this kind of circuit, the amplitude-modulated A, B field image signals Sf are supplied to the base of transistor TR1 and to the collector of clamping transistor TR2 via capacitor C1. The clamping pulse signal 82 is supplied to the base of clamping transistor TR2, which is biased by resistor R2, via capacitor C2. The averaged CCD output signal is supplied simultaneously to the emitter of clamping transistor TR2 via terminal 176 and transistor TR3. Therefore, the negative peak of the amplitude-modulated image signal is clamped by transistor TR3 to the reference clamp voltage level 158 in response to changes in level of the clamping pulse signal 82.

Figure 12:
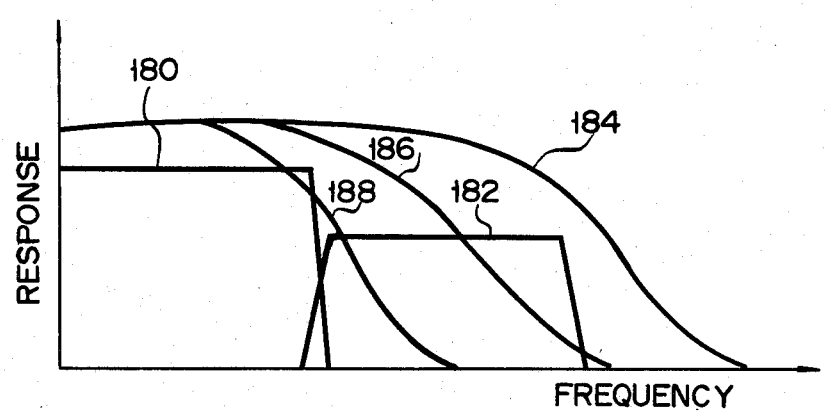
FIG. 12 is a graph showing a frequency characteristic of an image signal obtained according to the signal reproduction technique of the present invention.

FIG. 12 is graph showing the frequency characteristics of the reproduction image signal obtained in the above embodiment. The reference numeral 180 represents the averaged signal component, or base band component, while 182 represents the amplitude-modulated carrier signal component. The low frequency component of the image signal of this invention is obtained by the averaged signal component 180, so deterioration of the image quality in the low frequency band of the signal processing circuitry provided in a signal transmission system or display unit (not shown) can be prevented. The result of this is that the image quality of the reproduced image is improved.

For example, the response curve 184 shown in FIG. 12 shows the ideal frequency characteristics of an image signal with unusually little image quality deterioration. As shown by curve 186, even if frequency characteristic deterioration occurs in the transmission of signals, image quality deterioration does not become that serious. The reason for this is that even if the amplitude-modulated image signal components decrease due to deterioration of the frequency characteristics, there is very little decrease in the base band components. As shown by curve 188, even if the frequency characteristics deteriorate still further, there is relatively little decrease in the base band components compared with before. Accordingly, it is possible to effectively transmit or reproduce while maintaining the signal components required for reproduction.

Figure 13:
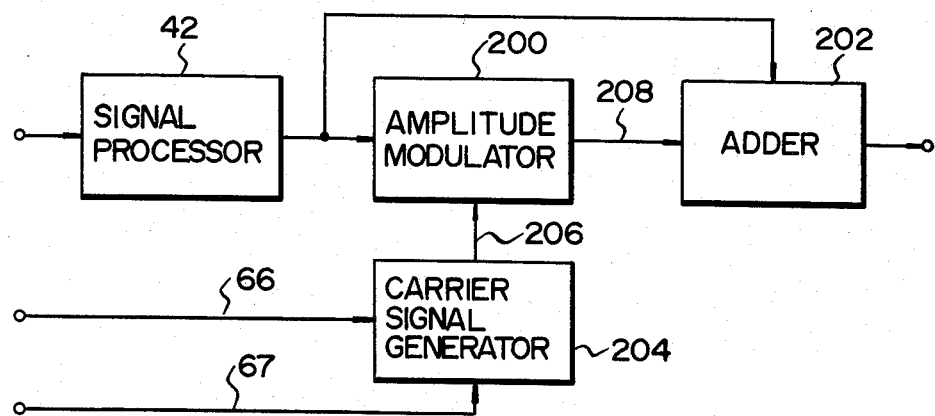
FIG. 13 is a schematic of an example of a circuit configuration for reproducing an image signal with high resolution according to the signal processing technique of the present invention.

The following is a description with reference to FIGS. 13 and 14 of a simple circuit construction capable of performing the CCD output signal reproduction technique of this invention as described in the embodiments. In this actual example, there is not much prevention of noise being mixed with the image signal, but the effects comparable to those of the above embodiments can be obtained in regards to the reproduction of high resolution image signals based on the output signals of a CCD device, which performs the swing pickup operation.

Figure 14A:
FIGS. 14A to 14E show the waveforms of essential signals generated by the main circuit components in the image signal reproduction device of FIG. 13.

In FIG. 13, the CCD is the same as that in the embodiments and is not illustrated. The output signal, which is output from the swinging CCD chip and which is averaged by a prior art signal processor 42, is supplied to AM circuit 200 and adder circuit 202. The waveform of this averaged CCD output signal is shown in FIG. 14A.

Figure 14B:
Figure 14C:
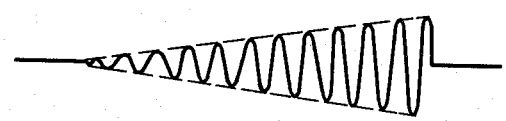

Carrier signal generator 204 is connected to AM circuit 200, and receives a horizontal clock pulse signal 66 having a frequency of 7.16 MHz, for example, and a field pulse signal 67, after which it supplies carrier signal 206, whose phase is synchronous with the spatial sampling peak of the CCD and which has a waveform such as that shown in FIG. 14B. Carrier signal 206 is modulated by AM circuit 200. The waveform of the amplitude-modulated A, B field image signals 208 is shown in FIG. 14C. The fact that the phase of these signals is shifted by half the horizontal pixel pitch PH of the CCD is the same as in the above embodiments. The amplitude-modulated A, B field image signals 208 and the averaged image signal from the signal processor 42 are electrically summed.

Figure 14D:
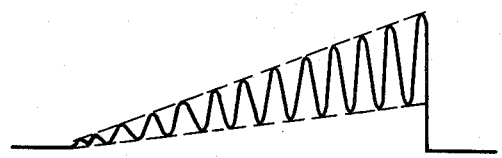
Figure 14E:
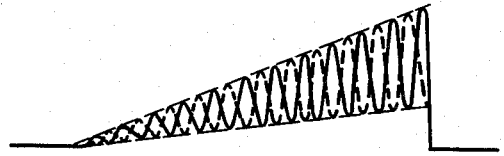

FIG. 14D shows the waveform of added image signal output by the adder circuit 202. As can be understood from FIG. 14D, the negative peak potential of each amplitude-modulated field image signal is clamped to the signal level of the averaged image signal. Then, a frame image signal formed from the A, B field image signals at the point where they have the waveform shown in FIG. 14E can be obtained if they are summed by adder circuit 202.

Figure 15:
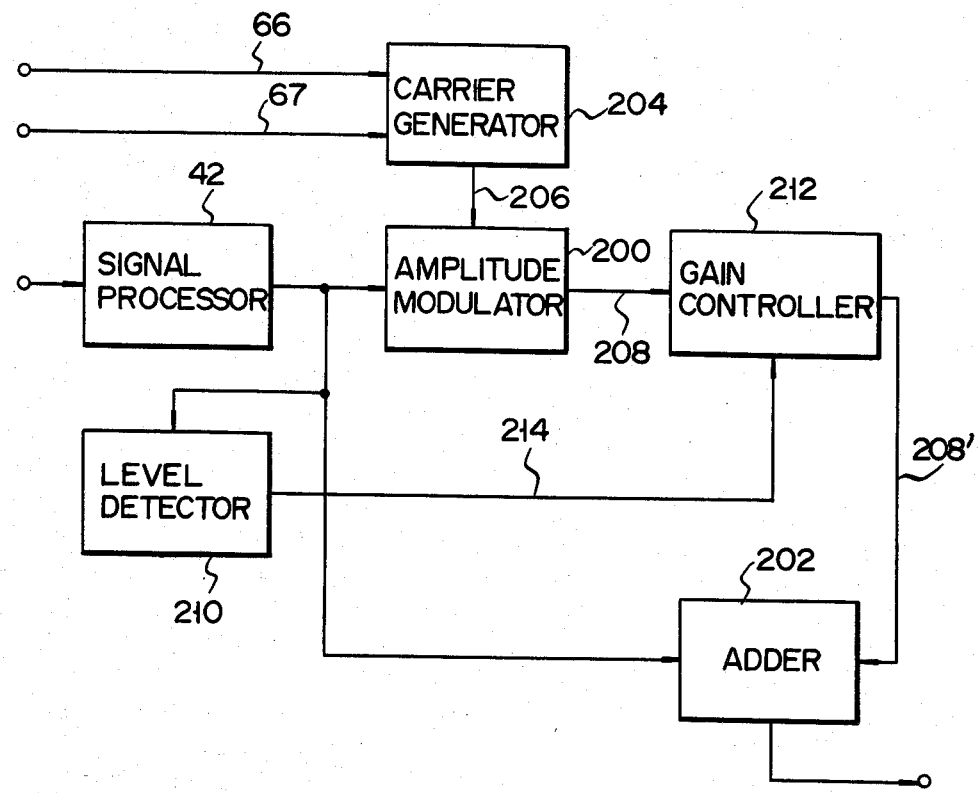
FIG. 15 is a schematic of another example of a circuit configuration for reproducing an image signal with high resolution.

FIG. 15 shows another example of circuit construction. According to this example, in order to improve the S/N ratio of the image signal in the low frequency band, a signal level detecting circuit 210 and gain controller 212 are further added. Signal level detecting circuit 210 is provided after signal processor 42. Gain controller 212 controls the output level of each amplitude-modulated field image signal 208 output from AM circuit 200 in response to detection signal 214 from level detector 210.

Figure 16A:
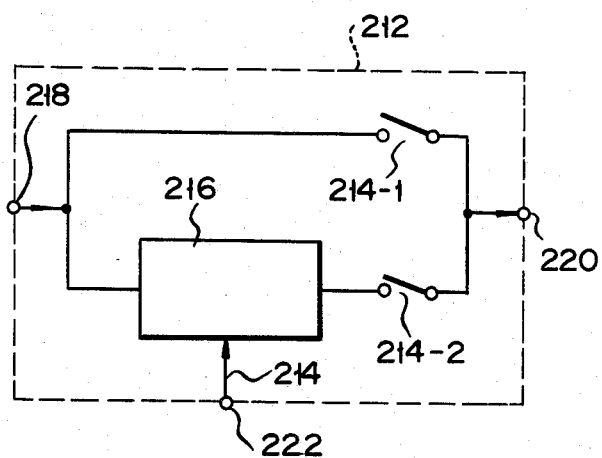
FIGS. 16A and 16B show two different examples of the arrangement of a gain controller provided in the circuit arrangement shown FIG. 15.
Figure 16B:
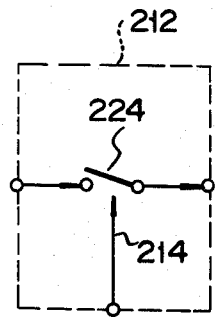

FIGS. 16A and 16B show actual examples of gain controller 212. FIG. 16A shows a construction in which the two switches 214-1 and 214-2 are connected in parallel and one switch 214-2 and attenuator 216 are connected in parallel. Reference numerals 218, 220 and 222 correspond to the input, output and control terminals. When the signal level of the averaged image signal from the signal processor 42 decreases to less than a predetermined reference level, level detector 210 supplies detection signal 214 to the control terminal 222 of gain controller 212. Switch 214-1 becomes nonconductive in response to this detection signal 214 and the other switch 214-2 becomes conductive. Accordingly, the output signal from AM circuit 200 is transmitted via attenuator 216 and, consequently, the signal level is restricted. The internal structure of the kind of gain controller shown in FIG. 16A can be simplified to include only one switch 224, as is shown in FIG. 16B.

Figure 17A:
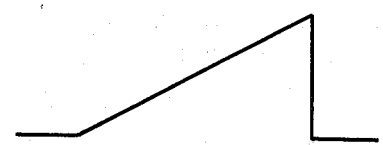
FIGS. 17A to 17F show the waveforms of main signals generated at the main circuit components in the image signal reproduction device of FIG. 15.
Figure 17B:
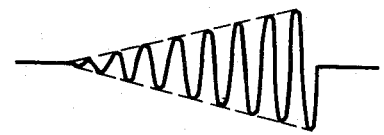
Figure 17C:
Figure 17D:
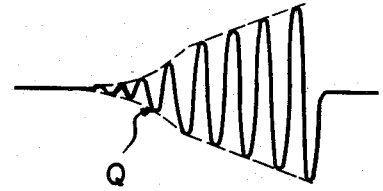
Figure 17E:
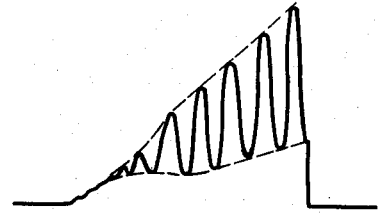
Figure 17F:
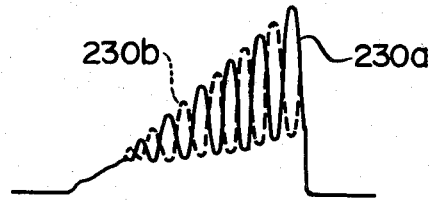

The AM circuit 200 modulates the sinusoidal carrier signal 206 based on the averaged image signal, which is output from signal reproducer 42 and has the waveform shown in FIG. 17A, to produce the amplitude-modulated A, B field image signals having the waveforms shown in FIG. 17B. In this state, level detector 210 detects the signal level of the averaged image signal when it decreases and crosses the reference level P, and sends a detection signal 214 having the waveform shown in FIG. 17C to the control terminal 222 of gain controller 212. During this time, each of the AM field image signals 208 are supplied to input terminal 218 of gain controller 212, which reduces the gain of the signal components of the AM field image signals 208 beneath the reference signal level P so the signal having the waveform shown in FIG. 17D can be obtained at the output terminal 220 of the gain controller 212. As is clear from FIG. 17D, the gain controller output image signal component which is beneath the signal level indicated by Q attenuates rapidly. The output image signal 208' from gain controller 212 and the averaged image signal from signal processor 42 are summed by adder circuit 202 to produce an amplitude-modulated field image signal having the waveform shown in FIG. 17E. These field signals are modulated so has to have their phases shifted by half a pixel pitch, gain controlled, and added on the reproduction screen in the same manner as in the previous embodiments to produce a frame image signal with doubled resolution and having the waveform shown in FIG. 17F.

The low level signal components of the production image signal, which is obtained based on the gain controlled A, B field image signals, are forcibly attenuated, and, consequently, there normally is concern that the resolution of that portion will be deteriorated. However, the low level image signal components are the dark images on the display screen so even if the resolution does deteriorate, there is very little influence to the overall resolution as far as the human eye can determine. Accordingly, this kind of gain control for reducing the noise mixed with the dark image components contributes greatly to image quality. If noise is mixed with the dark image portions of reproduced image, that noise will be seen, in an extreme case, as white snow falling against a dark background so it is very conspicuous even if there is only a smally quantity. This represents a more serious problem than that of noise in the light image portions. For this reason, the inclusion of gain controller 212 for the suppression of noise in the dark image portions is more important than high resolution in the dark portions.

Figure 18:
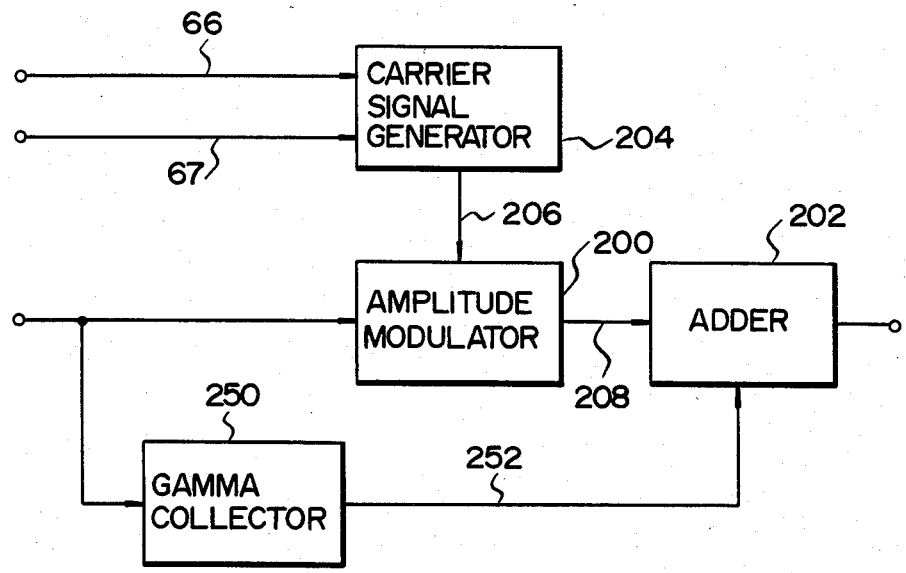
FIG. 18 is a schematic showing an example of another circuit for reproducing an image signal with high resolution.

It should be noted that the gain controlling operation of the amplitude-modulated field image signals can be performed to the same effect using a gamma correction circuit. As shown in FIG. 18, gamma correction circuit 250 is connected to adder circuit 202. This gamma correction circuit 250 is very essential for adjusting the relationship between the characteristics of the signal output for the incident image light of the CCD imaging device (10) and the light generated for the display unit (not shown). Therefore, as with the prior art, the gain of the low level image signal components are increased in accordance with the input/output relationship determined by the gamma correction circuit 250, and an image signal can be obtained which has the gain of the high level image signal components decreased.

Figure 19A:
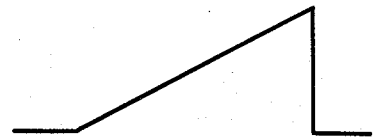
FIGS. 19A to 19D show the waveforms of the main signals generated by the main circuit components in the image signal reproduction device of FIG. 18.
Figure 19B:
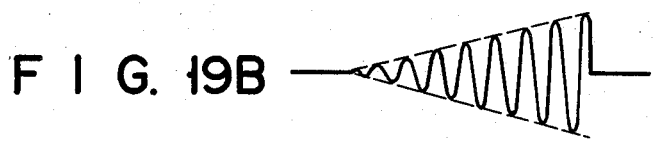
Figure 19C:
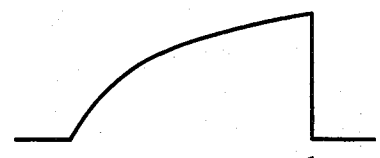
Figure 19D:
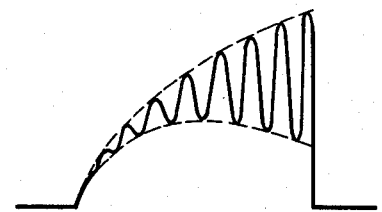

With the circuit structure shown in FIG. 18, when a CCD output signal having the waveform shown in FIG. 19A is supplied to AM circuit 200, the AM circuit 200 produces a field image signal with the waveform shown in FIG. 19B. This amplitude-modulated field image signal is supplied together with the averaged image signal 252, which has the waveform shown in FIG. 19C and is produced by the gamma correction circuit 250, to the adder circuit 202. An added image signal such as that shown in FIG. 19D is obtained at the output terminal of the adder circuit 202. Consequently, the S/N ratio on the low signal level side is improved and the overall resolution, including the large carrier component on the high signal level side, is improved. It also is not necessary to provide additional circuit components to accomplish this gain control so the overall circuit structure is simplified.

Although the present invention has been shown and described with respect to particular embodiments, various changes and modifications which are obvious to a person skilled in th art to which the invention pertains are deem to lie within the scope of the invention.

In the above embodiment, the image signal reproduction circuit is arranged to be applied to a monochrome video camera. However, the image signal reproducing concept according to the present invention can be similarly applied to a color video camera, which contains an RGB type one-chip color image sensor or a combination of three image sensors, and still show the same advantages.

What is claimed is:

1. An image apparatus comprising:
   (a) a solid state imaging device, which contains a solid state image sensor for periodically swinging in relation to incident light and in synchronism with one frame period, and for performing a swing image pickup operation while different sampling positions are changed between different field periods of one image frame, and which produces averaged first and second field image signals, said solid state image sensor having a pixel arrangement of a certain pitch;
   (b) carrier generator means, for producing first and second carrier signals which have a frequency substantially the same as the read out frequency of the signal charges of said imaging device, and which have peaks corresponding to first and second sampling positions of said imaging device occurring in first and second field periods included in one frame period;
   (c) modulator means for receiving said carrier signals, and for amplitude-modulating each carrier signal in accordance with the waveform of said averaged first and second field image signals supplied from said imaging device to thereby produce first and second amplitude-modulated field image signals, which are phase-shifted to each other by one half of the pixel pitch of the pixel arrangement of said imaging device, each of said first and second amplitude-modulated field image signals having peaks on the positive and negative sides; and
   (d) signal processing means for adjusting said first and second amplitude-modulated field image signals such that the peaks of one polarity of their waveform match a reference potential level, whereby a one-frame image signal having greater resolution than that determined by only the actual numbers of said imaging device is obtained when said waveform-adjusted field image signals are synthesized.

2. An imaging apparatus according to claim 1, wherein said signal processing means clamps the different peak potentials on the negative side of said first and second amplitude-modulated field image signals such that they match a constant reference potential level.

3. An imaging apparatus according to claim 1, wherein said signal processing means clamps the different peak potentials on the negative side of said first and second amplitude-modulated field image signals such that each matches a reference potential level which varies in response to the waveform of a corresponding field image signal from said imaging device.

4. An imaging apparatus according to claim 2, which further comprises: signal transmission cable means, provided between said modulator means and said signal processing means, for transmitting said first and second amplitude-modulated field image signals from said modulator means to said signal processing means.

5. An imaging apparatus according to claim 3, wherein said signal processing means comprises:
   pulse generator means for producing in said first field period a first clamping pulse signal having a pulse component that is synchronous with the negative peaks of said first carrier signal, and producing in said second field period a second clamping pulse signal having a pulse component synchronous with the negative peaks of said second carrier signal, to match the first and second clamping pulse signals with the changes in said first and second field periods and output them alternately;
   reference signal generator means for producing a first and second field reference signal in response to the waveform of said first and second field image signals based on said field image signal from said imaging device; and
   carrier clamping circuit means for alternately receiving said first and second amplitude-modulated field image signals and said first and second clamping pulse signals, and for clamping the potential peak on the negative side of each amplitude-modulated field image signal to said corresponding reference potential level while being synchronized with a corresponding clamping pulse signal.

6. An imaging apparatus according to claim 3, wherein said signal processing means comprises: gain controller means for reducing the amplitude of said first and second amplitude-modulated field image signals when the voltage level of said first and second amplitude-modulated field image signals drops below a prescribed potential.

* * * * *